(No Model.)
F. ECCLES.
GRINDING AND POLISHING MACHINE.
No. 269,647. Patented Dec. 26, 1882.
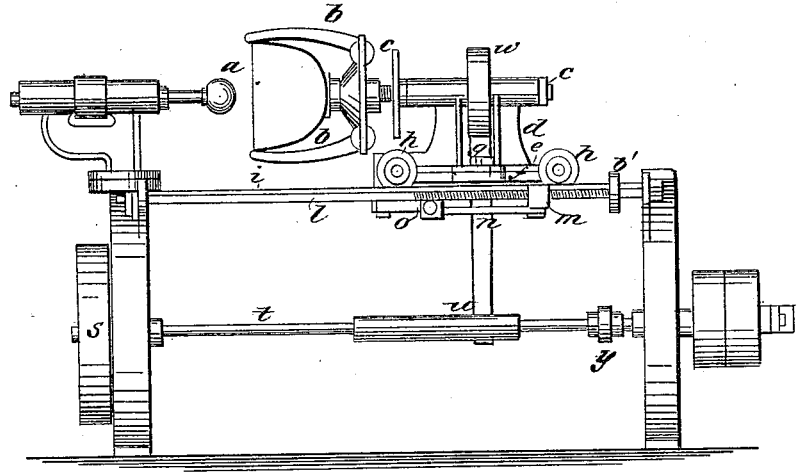
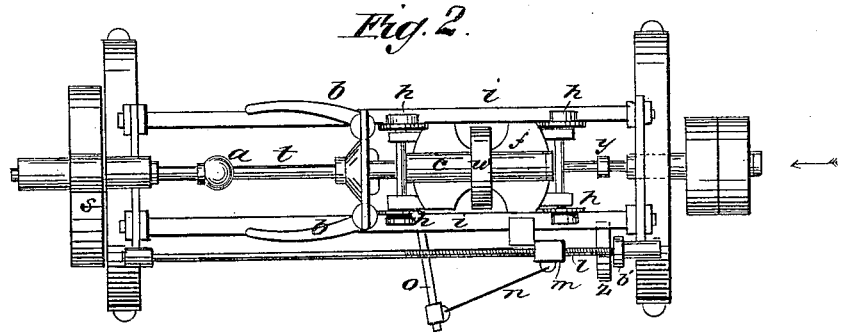
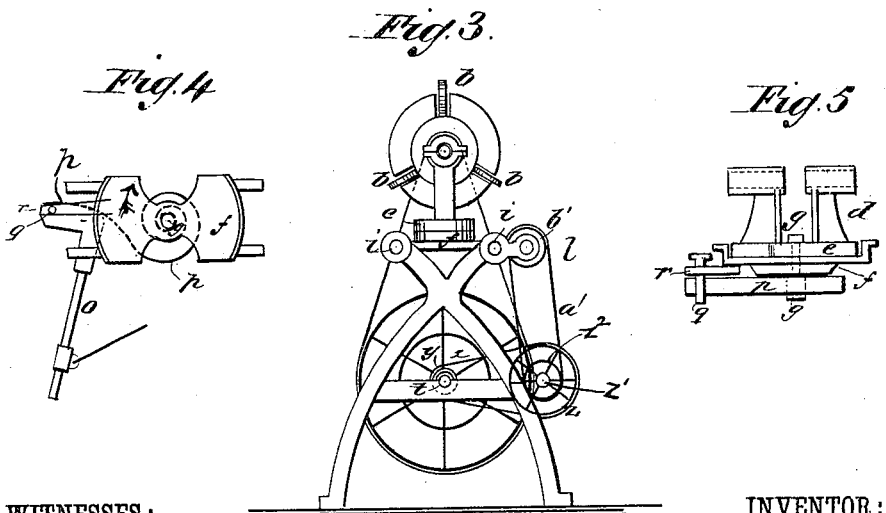
WITNESSES:
Francis McArdle
Chas. Lurcott
INVENTOR:
Fish Eccles
BY Munn & Co.
ATTORNEYS.

UNITED STATES PATENT OFFICE.

FISH ECCLES, OF AUBURN, NEW YORK.

GRINDING AND POLISHING MACHINE.

SPECIFICATION forming part of Letters Patent No. 269,647, dated December 26, 1882.

Application filed June 15, 1882. (No model.)

*To all whom it may concern:*

Be it known that I, FISH ECCLES, of Auburn, in the county of Cayuga and State of New York, have invented a new and Improved Grinding and Polishing Machine, of which the following is a full, clear, and exact description.

This invention consists essentially of a chuck for holding hollow ware to be ground and polished on the inner surface, mounted by a pivotal connection upon the carriage by which it moves along the ways on which it works to and from the emery-ball, and so geared with the feeding-screw and a spring that the chuck turns on its pivot suitably to present the irregular surfaces of the vessels to the polishing-ball, while the carriage moves the vessels along the ball, as hereinafter fully described.

Reference is to be had to the accompanying drawings, forming part of this specification, in which similar letters of reference indicate corresponding parts in all the figures.

Figure 1 is a side elevation of my improved machine for grinding and polishing hollow ware. Fig. 2 is a plan view. Fig. 3 is an end elevation. Fig. 4 is a plan of the carriage. Fig. 5 is a side elevation of the carriage.

The chuck for holding the hollow ware to be polished, so as to present the interior of the ware to the grinding and polishing ball $a$, may consist of any approved contrivance of arms, $b$, and suitable adjuncts, mounted on a mandrel, $c$, rotating in a head or stock, $d$, which I propose to mount by its base $e$ on the plate $f$ of a carriage by a vertical pivot, $g$, so that the chuck may swing to right and left, besides moving forward and backward with respect to the grinding-head $a$.

The carriage-plate $f$ is mounted by flanged wheels $h$ on the ways $i$ for working to and from the grinding-head $a$ to enable it to work with less friction than it can on slides.

$l$ represents the feed-screw, by which the chuck is moved toward and from the grinding-ball $a$. It is connected by nut $m$, connecting-rod $n$, and lever $o$ with the carriage $f$ for moving it back and forth; and $p$ represents a spring for turning the chuck at the same time on the pivot $g$, said spring being attached at one end to said pivot, coiled around it one or more times, and connected by its other end with a stud-pin, $q$, in the arm $r$, attached to carriage $f$, so that its tension tends to swing the chuck and press the inner surface of the vessel contained in it against the ball $a$.

It will be seen that, whatever the curvature of the side of the vessel may be, the spring will keep it in contact with the grinder while the vessel is moved along it from bottom to top. To begin with, the carriage is set up to the grinder by hand, after loosening the nut $m$ from the feed-screw $l$ by the common method used for that purpose, (not here shown,) so that the latter touches the center of the bottom of the vessel. The machine is then set in motion, the nut is connected with the feed-screw, and the motion continued until the feed-screw has withdrawn the vessel from the grinder, which completes the operation.

The grinder $a$ has no longitudinal motion relative to the ways $i$; but it is rotated at a high speed by a belt from the large pulley $s$ on the main shaft $t$. The chuck is slowly rotated at the same time by a belt from the drum $u$ on shaft $t$ to the pulley $w$ on its mandrel, and the feed-screw $l$ is driven by belt $x$ from pulley $y$ onto pulley $z$ of a counter-shaft, $z'$, from a pulley, $z^2$, on which belt $a'$ works, onto pulley $b'$ of the screw.

The arm O is diagonal to the line of the ways to allow the head-stock plate $f$ to be accurately adjusted relative to the nut $m$ by setting the rod $n$ at different angles.

It will be noticed that I am enabled to use wheels $h$ for the carriage to run on in this machine, because of the lateral vibration of the chuck-mandrel, which does not therefore demand the exactly true lineal reciprocation that requires the use of slides, for the lateral vibrations which the wheels are subject to do not interfere with the proper performance of the work.

Having thus fully described my invention, I claim as new and desire to secure by Letters Patent—

1. In a machine for grinding hollow ware, the combination, with the grinding-ball $a$, longitudinally fixed relative to the ways $i$, the ware-holding chuck $b$, the spindle $c$, carrying the chuck, and the horizontally-vibrating plate $e$, to which spindle $c$ is journaled, of the horizontally-reciprocating plate $f$, the pivot $g$, connecting the plates $e$ and $f$, and the spring $p$, fixed at one end to the pivot $g$, the other end being supported by a stud, $q$, in the arm $r$, extending from the plate $f$, as shown and described.

2. The combination, with the plates $f$ and $e$, the chuck $b$, and the revolving ball $a$, of the diagonal arm O, secured to plate $f$, the adjustable connecting-rod $n$, the screw-nut $m$, and the feed-screw $l$, as shown and described.

FISH ECCLES.

Witnesses:
C. H. SMYTH,
ADOLPH KEIL.